United States Patent [19]

Yuasa et al.

[11] Patent Number: 4,551,011
[45] Date of Patent: Nov. 5, 1985

[54] LIGHT SOURCE FOR EXPOSURE

[75] Inventors: Yoshio Yuasa, Osaka; Hidetoshi Yasumoto, Tondabayashi; Nobukazu Kawagoe, Sakai; Kazuhiko Naruse, Nabari; Masahito Inaba, Ikeda, all of Japan

[73] Assignee: Minolta Camera Kabushiki Kaisha, Osaka, Japan

[21] Appl. No.: 527,515

[22] PCT Filed: Dec. 9, 1982

[86] PCT No.: PCT/JP82/00462
§ 371 Date: Aug. 9, 1983
§ 102(e) Date: Aug. 9, 1983

[87] PCT Pub. No.: WO83/02171
PCT Pub. Date: Jun. 23, 1983

[30] Foreign Application Priority Data

Dec. 11, 1981 [JP] Japan ............................. 56-200496

[51] Int. Cl.$^4$ ................. G03B 27/72; H05B 37/00
[52] U.S. Cl. ........................... 355/35; 355/37; 355/68; 355/69; 315/241 P
[58] Field of Search ............ 355/35, 37, 38, 68, 355/69, 70, ; 315/241 P; 307/141

[56] References Cited

U.S. PATENT DOCUMENTS 4,246,514 1/1981 Metzger .................. 315/241 P
4,255,046 3/1981 Corona .................... 355/68

FOREIGN PATENT DOCUMENTS 48-766 11/1973 Japan .
4882904 11/1973 Japan .
51-8002 1/1976 Japan .
52-130229 11/1977 Japan .
5517177 2/1980 Japan .

Primary Examiner—L. T. Hix
Assistant Examiner—Della J. Rutledge
Attorney, Agent, or Firm—Price, Gess & Ubell

[57] ABSTRACT

An exposure light source device wherein a control circuit 1 controls a light source for emitting pulse lights, with respect to the member of light emissions and the amount of light emitted at each time. The light source device is particularly useful for color additive type photographic color enlarger. When the device is used in such an enlarger, the number of light emission and each emitted light amount is determined such that the exposure time is approximately the same regardless of the total amount of exposure.

10 Claims, 9 Drawing Figures

LIGHT SOURCE FOR EXPOSURE

TECHNICAL FIELD

The present invention relates to an exposure light source device for use in a color printer (or color enlarger) to be used for enlarging and printing color photographs or in a camera for photo-engraving. More particularly it pertains to such a device including a control circuit for controlling the amount of the light emitted from the light source to a desired value.

TECHNICAL BACKGROUND

In the light source of a conventional photographic enlarger, light is emitted continuously from a light emitter such as a halogen lamp that emits light of a constant intensity, and the duration of the light emission is controlled to control the amount of the emitted light and accordingly the amount of exposure for the photographic printing. In practice, however, it is difficult to keep constant the intensity of the light emitted from such a light source. To keep the intensity constant, the light source requires a power source stabilizer and the like and becomes complicated, cumbersome and thereby expensive. Moreover, a halogen lamp is bulky itself and has low efficiency of conversion from electricity to light. Of the electric energy applied to the lamp, the portion that is not converted to light, is converted to heat so that a large amount of heat is produced during the energization of the lamp. To avoid the effects of such heat, the light source device of the conventional enlarger requireds a cooling device such as a heat diffusing plate, a wind fan or the like and becomes inherently large in size.

Especially in the case of a color enlarger for printing color photographs, three light source lamps are employed for the exposure with three primary color lights of blue, green and red or otherwise a single light source lamp is coupled with three kinds of color filters or dichroic filters of blue, green and red such that the light from the lamp is incident on a film through the filters. In any case, the light source device becomes more cumbersome due to the increase in the number of lamps, or the provision of filters and a mechanism for the insertion and withdrawal of the filters and for the control of the amount of the insertion or withdrawal. Additionally, the amount of exposure must be controlled more accurately in color printing than in the case of monochromatic photography printing.

On the other side, a photo-engraving camera is known which employs a pulse light emitting light source such as a Xenon tube and in which the total amount of light emission i.e. the amount of exposure is controlled by controlling the number of the emissions of the pulse light source on the presumption that all the light amount at each emission of the pulse light source is equal. The light source such as the Xenon tube has various advantageous features. That is, it is comparatively small in size as may be understood from the fact of being used as a flash device for use with a photographic camera. Further, the light source has good efficiency of electricity-to-light conversion and is a so-called heatless (or heat-free) light source. Accordingly, compactness of the power source may be attained if such a light source as the Xenon tube is adopted in a photographic enlarger. In the case where the amount of exposure is controlled by adjusting the number of light emissions as in the photo-graving camera, however, the amount of light at each emission must be made small resulting in an increase of the number of light emissions and accordingly an increase in the exposure time for obtaining a larger amount of exposure, if it is intended to improve the resolution of the exposure adjustment i.e. to reduce the unit change of the exposure amount. Additionally, the amount of pulse light emitted from the aforementioned light source varies in practice and it is likely to occur that the amount of an actual exposure differs from the amount estimated from the number of light emissions.

DISCLOSURE OF THE INVENTION

An object of the present invention is to provide an exposure light source which is small in size, requires less time for the exposure and in which the amount of emitted light is controlled with high accuracy.

The present invention employs one or more pulse light sources such as Xenon tubes and is adapted to control the number of light emissions and the amount of light per emission in accordance with data of exposure given by manual or automatic setting.

According to an embodiment of the present invention, the unit amount of light to be emitted at the first time is determined to a value equal or approximate to the value obtained by dividing the total amount of exposure by an appropriate number, the total amount of exposure being determined in accordance with the set exposure data. The light source is actuated at appropriate times to emit at each time light of the determined value until the remaining amount obtained by subtracting the product of the amount of the light at each emission and the number of the light emissions from the total amount of light emission becomes lower than a given value. Then, the amount of light to be emitted each time is changed to a smaller value and light is emitted at appropriate times by the changed amount. The amount of light per emission is changed further in accordance with the remaining amount. Thus, it is contemplated that the total number of light emissions always becomes approximately equal regardless of the total amount of light emitted. It should be noted that the less the total number of the light emissions is, the shorter the exposure time will be, but that an exceedingly short exposure time is improper for shading (partial underexposure) or burning-in (partial overexposure, providing more exposure to some portion) in the printing process. In the embodiment of the invention, the amount of pulse light at each emission and the number of light emissions are determined in view of such considerations.

Further, according to the embodiment of the present invention, the amount of light emitted from a pulse light source is monitored photoelectrically to control the amount of light at each light emission and the total amount of emitted light in accordance with the result of the monitoring, thereby enabling accurate determination of the amount of exposure.

According to the present invention, one or more pulse light sources such as Xenon tubes are used so that the light source itself is small in size and no cooling device is required due to the good efficiency of electricity-to-light conversion, whereby the light source assembly will be small. Further, as the present invention controls not only the number of pulse light emissions of the light source but also the amount of pulse light emitted at each time, a desired resolution is obtained for the exposure amount control and the time required for exposure can be determined arbitrarily by selecting the number of light emissions.

It should be understood that although the present invention is especially effective for photographic color enlargers of the color additive type or the type with three light sources and the above general explanation of the invention and the following description of the embodiment are made in connection with such color enlargers, the present invention can be applied to light sources of various apparatus such as monochromatic enlargers, photo-graving cameras, an illumination device for photocopy and so on.

PREFERRED EMBODIMENTS FOR CARRYING-OUT THE INVENTION

Figure 1:
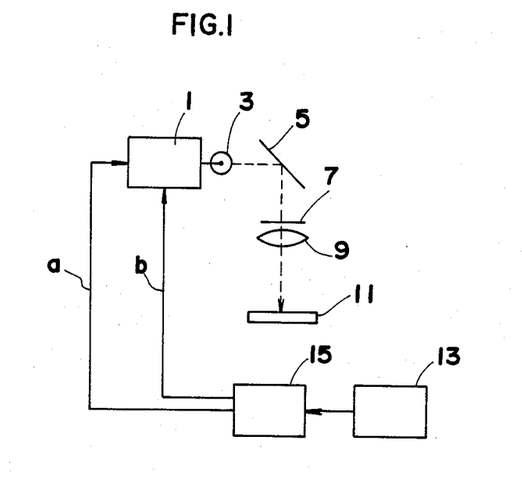
FIG. 1 is a schematic illustration of the first embodiment of the present invention.

Explanation will now be made of the embodiment wherein the invention is applied to a color enlarger. With reference to FIG. 1, a light control section 1 controls the light emission of a light tube 3 connected thereto. The light tube may preferably be an electronic flash tube such as a Xenon tube which emits flash lights as the pulse light. The light emitted from the light tube 3 is reflected by a reflex mirror 5 and traverses a negative film 7. A projector lens 9 projects and forms the image on the negative film 7 on an easel plane 11.

Exposure data outputting section 13 generates the data of exposure amount set manually or automatically. The automatic setting may be made by deriving the stored data from a storage media which may have the form of a RAM of a microcomputer, a magnetic tape or paper tape which stores light measurement data obtained by a manner similar to that employed in a so-called negative color analyzer as shown in, for example, U.S. Pat. Nos. 3,761,188 and 3,927,938 and U.S. Reissue Pat. No. 28,771. In the negative color analyzer, a light source emits light of given intensity and color density, the light is introduced to a negative film to be printed, the light traversing the film is measured and data for an exposure condition that provides the best prints for the negative film is given. It is preferable that the data of the manually or automatically set exposure data is indicated with the unit of a logarithmically compressed data system (indicated by CC), and that the output data is expressed with the unit of a linear system. An exemplary relationship between the indication and the output data is shown in Table 1.

TABLE 1

| CC indication | Output Data (Exposure Amount Data) |
| --- | --- |
| 0CC~30CC | 128~256 |
| 30CC~60CC | 256~512 |
| 60CC~90CC | 512~1024 |
| 90CC~120CC | 1024~2048 |
| 120CC~150CC | 2048~4096 |
| 150CC~180CC | 4096~8192 |
| 180CC~210CC | 8192~16384 |
| 210CC~240CC | 16384~32768 |

The data from the exposure data outputting section 13 is input to a calculating section 15 where calculations as described below are made to obtain data for the amount of light to be emitted at each time when the light emitting portion 3 is actuated to emit light a plurality of times. Calculating section 15 generates data for the duration of the light emission corresponding to the calculated data for the to-be-emitted light amount. Next, explanation will be made about the calculation for the control of the amount of light to be emitted. Assume that Et represents an exposure amount and F1 represents the amount of light to be emitted the first time. F1 is determined to a value that is a multiple of two and that is smaller than and closest to the quotient of the division of the exposure amount Et by sixteen. Light tube 3 is actuated n1 times to emit light of the amount F1 at each time. If Er1 is defined as follows:

$$Et - n1 \cdot F1 = Er1 \qquad (1)$$

wherein
n1 is the number of light emissions by the amount F1 at each time, and
Er1 is the remaining amount of exposure after the light emissions of n1 times by the amount of F1 at each time,
the light emissions are continued until $$Er1 < 16 \cdot F1 \qquad (2)$$

is attained. When the relationship of formula (2) is attained, the amount of light to be emitted at each time is changed to F2 wherein $$F2 = F1 \qquad (3)$$

and light is emitted by the amount of F2. If Fr2 is defined as follows:

$$Er2 = Er1 - n2 \cdot F2 \qquad (4)$$

wherein
n2 is the number of light emissions by the amount of F2 at each time, and
Fr2 is the remaining amount of exposure after the further light emission of n2 times by the amount of F2 at each time,
the light emissions are continued until the relationship $$Er2 < F1 = 2F2 \qquad (5)$$

is attained whereupon the amount of the light to be emitted at each time is changed to F3 and the light emissions are continued with the amount of emitted light at each time being controlled to F3, wherein $$F3 = F2/2 = F/4 \qquad (6)$$

Then, if Er3 is defined as follows:

$$Er3 = Er2 - n3 \cdot F3 \qquad (7)$$

wherein
  n3 is the number of light emissions by the amount of F3 at each time, and
  Er3 is the remaining amount of exposure after the light emissions of n3 times by the amount of F3 at each time,
the light emissions by the amount of F3 at each time are continued until $$ER3 < F3 = F_3^1 \qquad (8)$$

is attained whereupon the light emission is stopped. Thus, n1 will be 16 at the most, n2 will be 30 at the most and n3 will be 3 at the most. Accordingly, the exposure will be terminated after 49 times of light emissions at the most. As the remaining amount Er3 of exposure has a value restricted by the following inequality:

$$ER3 < F3 = F_3^1 < Et/(4 \times 16) \qquad (9)$$

it is less than 1.6% of the total amount of exposure and less than 1 CC by the logarithmically compressed unit system. Accordinly, the error due to the remaining amount Er3 is negligible.

The relationship between the total amount Et of exposure and the amount of the light to be emitted the first time is given by following table 2:

TABLE 2

| The first time emitted light amount F1 | Total amount of exposure Et |
|---|---|
| 2 | |
| 4 | |
| 8 | 128~256 |
| 16 | 256~512 |
| 32 | 512~1024 |
| 64 | 1024~2048 |
| 128 | 2048~4096 |
| 256 | 4096~8192 |
| 512 | 8192~16384 |
| 1024 | 16384~32768 |

An example of calculation for the light emission control will now be explained with reference to the table. When the total amount of exposure is 3000 ($100 \times \log_{10}(3000/128) = 137$ CC), the first division will be $3000 \div 16 = 187.5$ and the data of the unit amount of the first light emission will be 128 ($2^7$). The time required for the Xenon tube 3 to emit the light of the amount 128 is set, and the light control section 1 makes the Xenon tube 3 emit the light for the set time. The duration of the light emission may be controlled by an appropriate timer coupled with a flash light interruption circuit such as used in an electronic flash device with a series control type automatic light control. When the light emissions of the unit amount 128 have been made eight times, the remaining amount of exposure becomes 1976 which is smaller than the lower limit value of exposure amount in the range corresponding to the emitted light amount 128 i.e. $2048 = 128 \, (=F1) \times 16$. Then, the amount of light to be emitted is changed to $2^6 = 64$ which is smaller by one step and the light tube 3 is actuated to emit light by the amount 128 each time as much as 29 times. After that the remaining amount of exposure becomes 120 which is smaller than 128 (=F1). Then, the amount of light to be emitted is changed further to 32 ($=2^5$) which is further smaller by one step and the light tube 3 is actuated to emit light of the changed amount 32 three times. Then, the remaining amount of exposure will become 24 which is 0.8% ($=24/3000 \times 100$) of the total amount of exposure 3000 and negligible. At this time, the light emission is terminated. It should be understood that a signal for initiating the light emission of light tube 3 is generated from terminal (a) and a light emission terminating signal is generated from terminal (b) after a lapse of a predetermined time period.

Figure 2:
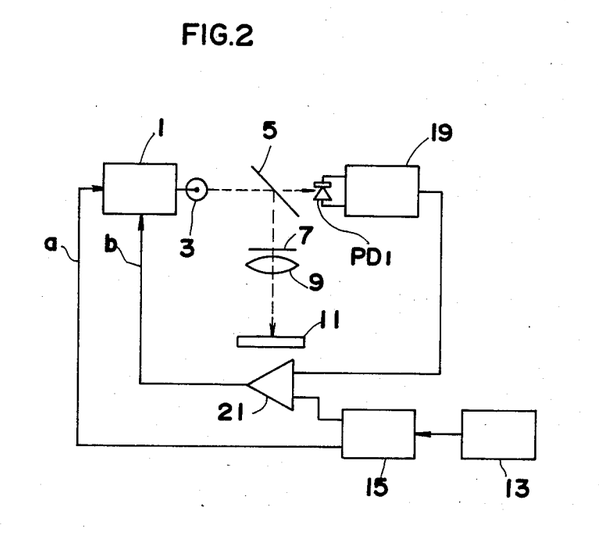
FIG. 2 is a schematic view of the second embodiment of the invention.

In FIG. 2, the same reference characters are used for the same elements as those of FIG. 1. Although the amount of light emitted at each time is controlled by controlling the duration of the light emission in the embodiment shown in FIG. 1, the amount of light emitted from flash tube 3 is monitored and controlled in accordance with the monitoring in the embodiment shown in FIG. 2.

A reflex mirror 5 has a light transmissive portion and the light emitted from the Xenon tube 3 and traversing the light transmissive portion is received by a light detector PD1 which in turn generates a photoelectric current. An integration circuit 19 integrates the photoelectric current. An comparator 21 compares the value of the integration by the integration circuit with the data (F1, F2 or F3) of the to-be-emitted light amount fed from an exposure amount control section 15. When the value of the integration and the light amount data become identical with each other or when the relationship between them with respect to their level or magnitude is inverted, the comparator 21 inverts its outputs so that the light control section 1 interrupts the light emission of the flash tube 3. It should be understood that a light emission initiating signal is generated from terminal (a) and a light emission terminating signal is generated from terminal (b) also in the embodiment of FIG. 2.

Figure 3:
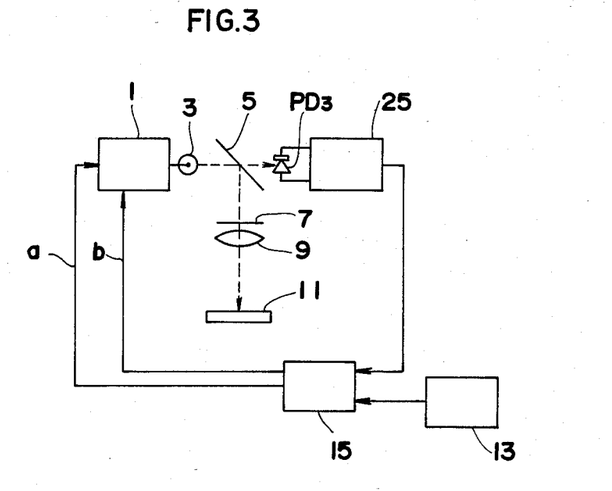
FIG. 3 is a schematic view of the third embodiment of the present invention.

FIG. 3 is a block diagram showing a third embodiment of the present invention. In the first embodiment, the amount of light emission is controlled by controlling the duration of the light emission. However, in the case of controlling the duration of light emission, it is likely that the amount of light emitted from Xenon tube 3 varies with each emission. To avoid such a problem, in the third embodiment, each light emission is detected by a light detector PD3 and the amount of the emitted light is monitored by a monitoring circuit 29 to correct or adjust the emitted light amount.

Then the method of the correction or amendment will be explained. The data F1 for amount of the first or initial light emission is determined, for example, to be 128 in the same manner as in the first embodiment. The duration of the light emission is set and the first light emission is made. The amount of the light emitted thereat is monitored by the monitoring circuit 25 and it is judged whether the condition shown by the following inequality (10) has been established or not with respect to the monitored data M1 of the moniutred value:

$$Et \geqq 32 \cdot M1 \qquad (10)$$

If the condition expressed by the inequality (10) has been established, it is determined that the amount of light to be emitted each time is so small that the number of light emissions will become too many. In this case, the data for the emitted light amount is changed to F1+ e.g. to 256 (double of 128) and the subsequent light emission is carried out with the duration of the light emission being set to a value corresponding to the changed data F1+. The amount of the light emission at that time is monitored at each emission and the light emission in compliance with the data F1+ (e.g. 256) is continued until the 16 times of the monitored value M1+ satisfies the following inequality (2'):

$$Er1 < 16 \cdot M1+ \quad (2')$$

When the relationship expressed by inequality (2') has been established, the data for the amount of light to be emitted is changed to F2+ (e.g. 128) and light emissions are continued with the amount of emitted light being controlled in compliance with the data F2+ (e.g. 128) until the condition given by the following inequality (5') is established:

$$Er2 < 2 \cdot M2+ \quad (5')$$

When the condition of the inequality (5') has been established, the data for the amount of the light to be emitted is changed to F3+ (e.g. 64) and light emission by the amount based on the data F3+ is continued until the condition given by the following inequality has been established:

$$Er3 < M3+ \quad (6')$$

In case the value M1 of the monitoring at the first light emission satisfies the following inequality (11):

$$32 \cdot M1 > Et \geq 16 \cdot M1 \quad (11)$$

the data for the amount of light to be emitted is left unchanged to be F1 and light emission is carried out repeatedly until the condition given by the following inequality (2') is established:

$$Er1 < 16 \cdot M1 \quad (2')$$

whereupon the data for the amount of light to be emitted is changed to F2. Then light emission is continued until the condition given by the following inequality (5') has been established:

$$Er2 < 2 \cdot M2 \ldots \quad (5')$$

After that, the data is changed to F3 and light emission is continued until the condition given by the following inequality (6') is established:

$$Er3 < M3 \quad (6')$$

whereupon the light emission is terminated.

Further, in case the monitored value M1 satisfies the following inequality (13):

$$Et < 16 \cdot M1 \quad (13)$$

it will mean that the amount of light emitted per time is so large that the necessary amount of exposure is likely to be exceeded by several emissions and that the number of light emissions will be too small. In this case, the data for the amount of light to be emitted each time in the first succession is changed to F1− (e.g. 64) and the emitted light is controlled sequentially in a manner similar to the second case.

It should be noted that the idea of directly monitoring the amount of light emitted from a light tube as was done in the third embodiment may be applied to light controls of a type other than the control of the pulse lights. That is, a light source such as a halogen lamp that emits a constant light may be controlled in a manner such that the intensity of the emitted light is directly monitored and the result of the monitoring is fed back to a driving circuit for the light source to maintain the constant output of the monitor during the exposure. Otherwise, an adjustment may be made such that the exposure time is changed in response to the change in the output of the monitor.

Figure 4:
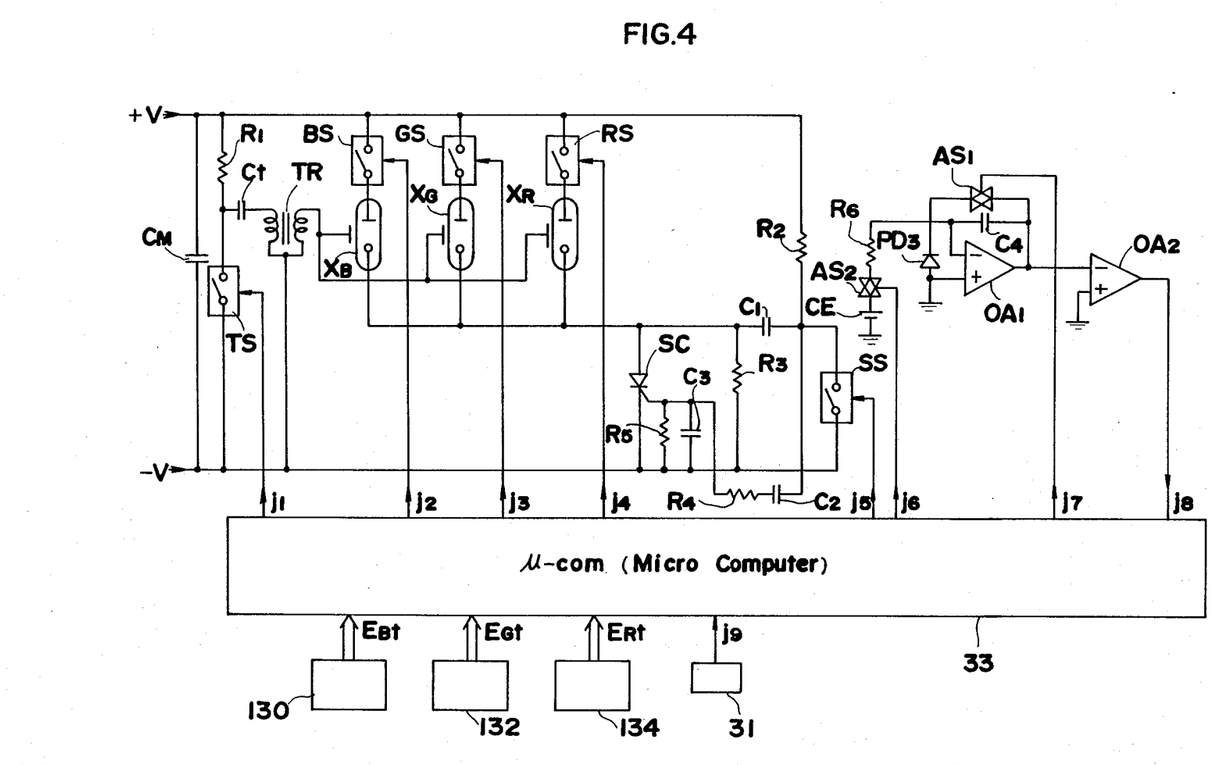
FIG. 4 is a circuit diagram showing a definite circuit construction of a light source control section of a color additive type color enlarger to which the third embodiment shown in FIG. 3 is applied.
Figure 5A:
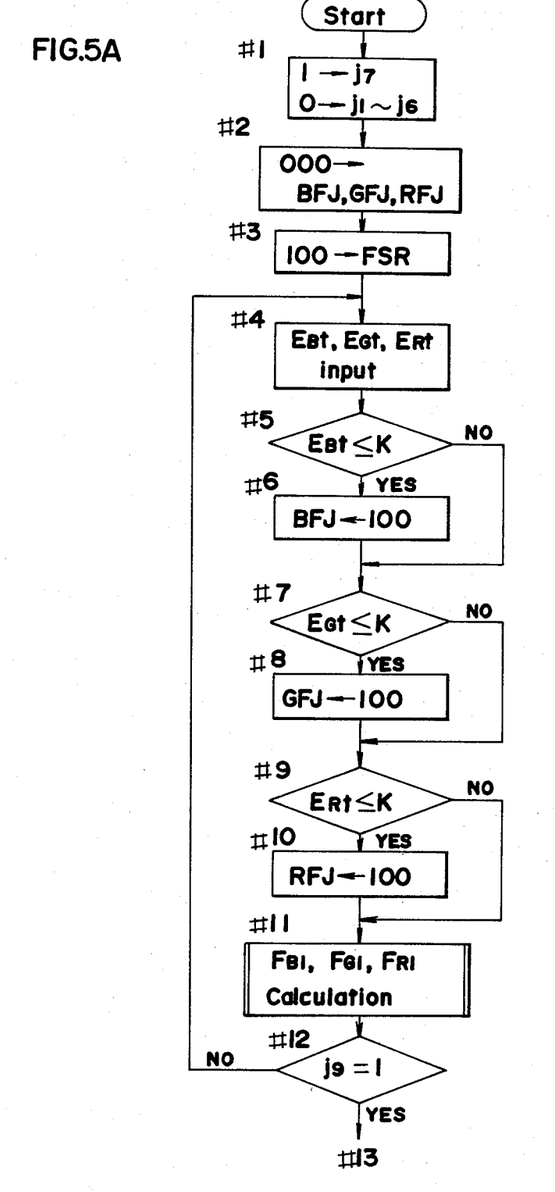
FIGS. 5(A) and 5(B) and FIGS. 6(A) and 6(B) are flowcharts showing the operation of the microcomputer in FIG. 4.
Figure 5B:
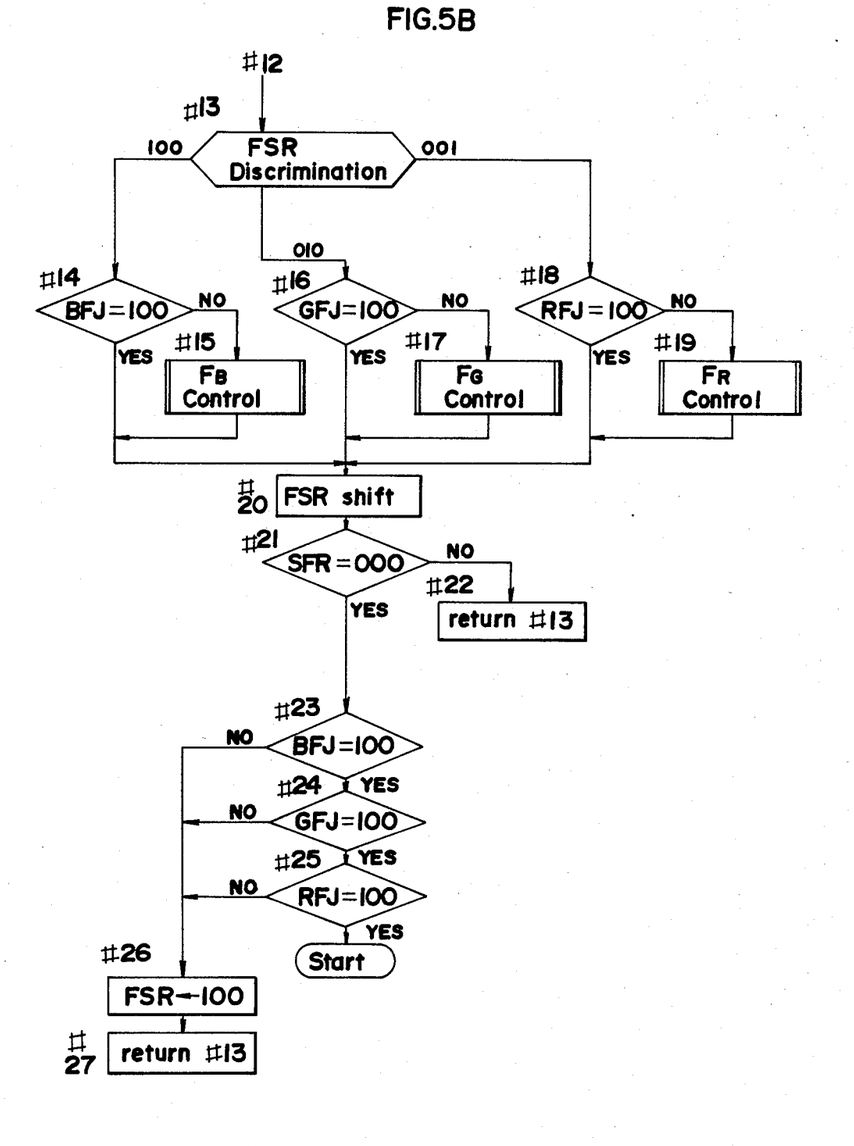
Figure 6A:
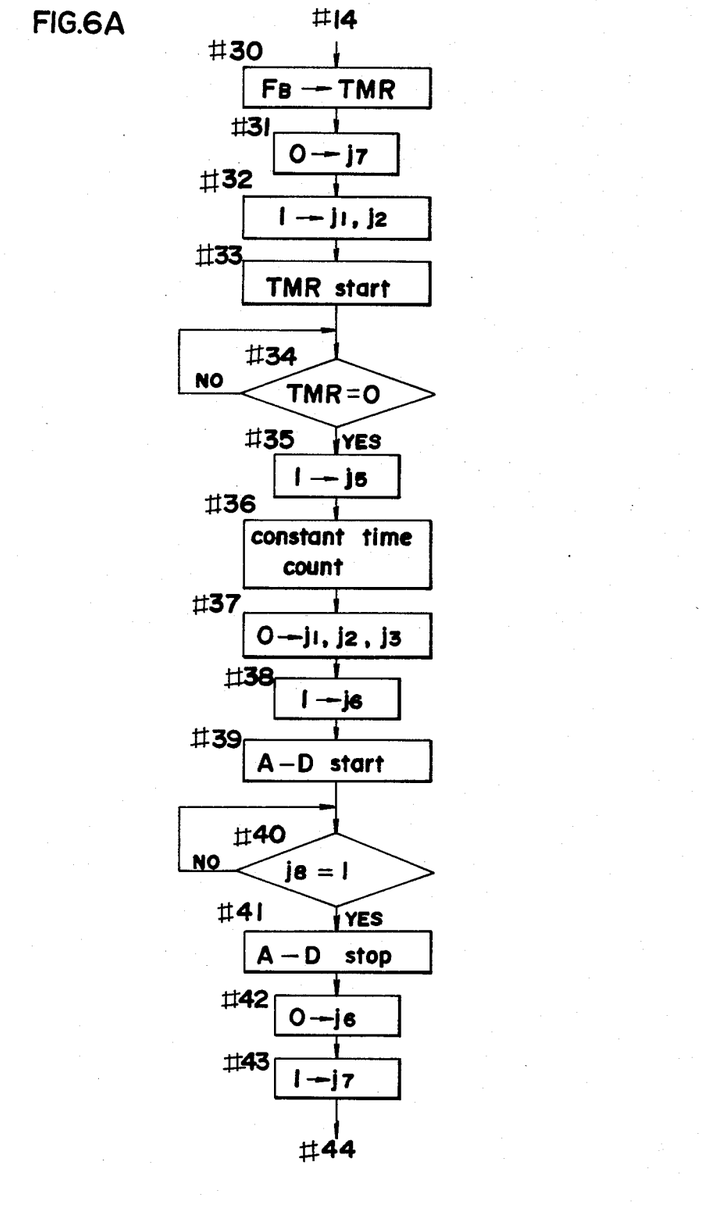
Figure 6B:
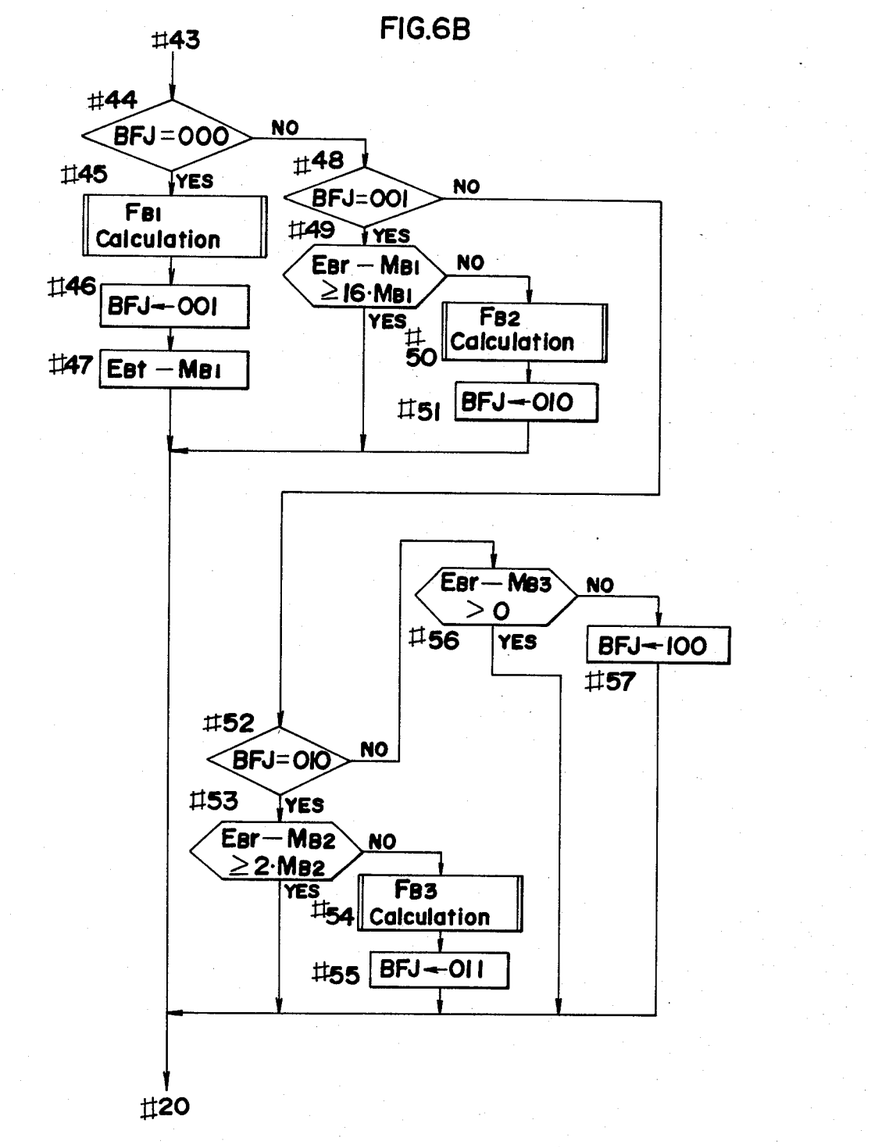

FIG. 4 shows an exemplary definite circuit construction where the third embodiment of the present invention is applied to a color additive type enlarger, while FIGS. 5 and 6 are flowcharts showing the operation of the microcomputer 33 (designated as μ-com) in FIG. 4. The operation of the FIG. 4 circuit will now be explained with reference to FIGS. 5(A), 5(B), 6(A) and 6(B).

When a power source is turned on to actuate microcomputer 33, the potential at terminal j7 of microcomputer 33 becomes "High" and the potentials at terminals j1 to j6 become "Low" so that the circuits besides the microcomputers are set to their initial conditions. Subsequently, data of "000" is set respectively in registers BFJ, GFJ and RFJ (not shown) included in the microcomputer. In those registers are respectively set the data representing the light emission conditions of three Xenon tubes XB, XG and XR which are adapted to emit lights through blue, green and red color filters respectively to provide light for the printing of color photographs. The following table 3 shows the relationship between set data and the light emission condition corresponding thereto.

TABLE 3

| Set data | Condition |
| --- | --- |
| 000 | No light emission has been made. |
| 001 | Light emission by F1. |
| 010 | Light emission by F2. |
| 011 | Light emission by F3. |
| 100 | Light emission is unnecessary. |

In step #3, a data of "100" is set in a tube selection register FSR (not shown) included in microcomputer 33. The tube selection register stores data for determining which one of the blue, green and red light Xenon tubes XB, XG and XR is fired. When the data is "100", the blue light Xenon tube XB is energized while green and red light Xenon tubes XT and XR are energized when the data is "010" and "001" respectively. In step #4, exposure amount data FBt, EGt and ERt for the blue, green and red lights is taken up into the microcomputer 33 from blue, green and red light exposure amount data supplying sections 130, 132 and 134. In the steps #7 through #10, it is judged whether each exposure data is smaller than a value K which represents the minimum amount of exposure, e.g. 128 i.e. 0 CC in the table 1. When the exposure amount data EBt, EGt or ERt is smaller than K, a data of "100" is set in the register BFJ, GFJ or RFJ because exposure is unnecessary with such a light.

In step #11, data FB1, FG1 and FR1 for the amounts of light to be emitted at the first successions are calculated from the exposure amount data EBt, EGt and ERt. The manner of the calculation is such that the exposure amount data Et is shifted by four bits to the right. This shifting corresponds to a division by 16. The resultant data is compared sequentially with the data of 1024, 512, 256, 128, 64, 32, 16, 8, 4 and 2 until the shifted data becomes larger than the data being compared whereupon the last compared data is determined to be the data of the amount of light to be emitted. That is if $$512, 256 > Et/16 \geqq 128, 64,$$

the emitted light amount data F1 will be 128 with the exposure amount data Et being in the range shown as $$2048 \leqq Et < 4096$$

In step #12, it is judged whether or not the potential at the output terminal J9 of a block 31 is "High" to represent that an exposure initiation signal has been input to the microcomputer 33. When the potential at the terminal J9 is "Low", the operation of the microcomputer is returned to step #4. When the potential at the terminal J9 is "High", the operation proceeds to step #13 wherein the content in the tube selection register FSR is identified. When the content of the register FSR is "100", the operation junmps to step #14. When the content is "010", the operation jumps to step #16. When the content is "001", the operation jumps to step #18.

In step #14, it is discriminated whether the content of register BFJ is "100" or not. When the content is "100", the operation jumps to step #20 since the blue light Xenon tube XB need not be fired. When the content of register BFJ is not "100", the operation jumps to step #15 wherein the microcomputer 33 controls the amount of blue light to be emitted. Then the operation jumps to step #20. Similarly, when the contents of registers GFJ and RFJ are respectively "100" in step #16 or #18, the operation jumps to step #20 since the green light Xenon tube XG or the red light Xenon tube XR need not be fired. If the content is not "100", the operation jumps to step #17 or #19 wherein the amount of light emitted from Xenon tube XG or XR is controlled. Then the operation jumps to the step #20.

The process of the emitted light amount control of the blue light Xenon tube XB in step #15 is shown in detail in FIG. 6. The operation for the control of the amount of the blue light to be emitted per time is now explained with reference to FIGS. 6(A) to 6(B). In step #30, data of the duration of the light emission necessary for the blue light Xenon tube to emit light of the amount of FB (=1024, 512 ... 4 or 2) is set in a timer register TMR (not shown) included in the microcomputer 33. The following table 4 shows the relationship between the duration of the light emission and the amount of the light to be emitted. The relationship is determined on the assumption that the main capacitor for storing electric energy for energizing the Xenon tube XB has a capacity of 500 μF and the capacitor is charged as high as 300 volt. The durations in the table are shown in microsecond units.

TABLE 4

| Light Amount to be Emitted | | Duration of Light Emission |
|---|---|---|
| 0 Ev | 1024 | 1000 μsec |
| −1 Ev | 512 | 420 μsec |
| −2 Ev | 256 | 250 μsec |
| −3 Ev | 128 | 160 μsec |
| −4 Ev | 64 | 115 μsec |
| −5 Ev | 32 | 84 μsec |
| −6 Ev | 16 | 59 μsec |
| −7 Ev | 8 | 42 μsec |
| −8 Ev | 4 | 30 μsec |

TABLE 4-continued

| Light Amount to be Emitted | | Duration of Light Emission |
|---|---|---|
| −9 Ev | 2 | 21 μsec |

The data on the duration of light emission may be derived as such: A data signal corresponding to the data FB of the emitted light amount designates an address in the ROM of the microcomputer and data of a light emission duration fixedly stored in the designated address is derived. Then, the potential at terminal j7 becomes "Low" to block an analog switch AS1, enabling integration of the output current of light detector element PD3 by an integrating capacitor C4. At the same time, the potentials at terminals j1 and j2 become "High" to close a trigger switch TS and a selection switch BS so that the blue light Xenon tube XB is fired. Simultaneously with the firing, timer TMR, for the control of the duration of light emission, starts the countdown of time. When the counting is completed, the potential at terminal j5 becomes "High" to close a stop switch SS and interrupt the light emission of the Xenon tube XB.

Now, the light emission control circuit in FIG. 4 is explained briefly. When a trigger switch TS is closed, a trigger voltage is applied to Xenon tubes XB, XG and XR by means of a trigger capacitor Ct and a trigger transformer TR. At this time, one of the switches BS, GS and RS is selectively made conductive by the signal from the one selected terminal among j2, j3 and j4. And one of the Xenon tubes XB, XG and XR that is connected with the conducted switch comes to have a low impedance, which raises the anode potential of a thyristor SC. Accordingly, a thyristor SC is triggered and made conductive through capacitors C1 and C2 and resistor R4. The conduction of the thyrister SC fires one of the Xenon tubes XB, XG and XR that is connected with the one selected switch among BS, GS and RS. After that, when the stop switch SS is closed, the anode potential of the thyrister SC is dropped below its cathode potential by the capacitor C1 so that thyrister SC is blocked to interrupt the light emission of the Xenon tube XB, XG or XR. A resistor R1 serves to provide the charging path for the trigger capacitor C1 while resistors R2 and R3 are provided for charging the stop capacitor or commutation capacitor C1. A capacitor C3 and resistor R5 serve to prevent noise.

In step #36, the time from the outputting of the light emission interrupting signal to the actual stoppage of the light emission is counted. Then, the potential at the terminal j1, j2 or j3 is made "Low" to open the switch TS, BS or SS. At that time, the capacitor C4 has been charged with the electric charge in accordance with the monitoring of the amount of the light emitted by the Xenon tube XB. Subsequently, the potential at the terminal j6 is made "High" to conduct an analog switch AS2 so that the capacitor C4 is reversely charged by a constant current determined by a constant voltage source CE and a resistor R6. When the reverse integration is started, a timer for A/D conversion starts counting. When the charge in the capacitor C4 becomes zero, the output of an operational amplifier OA1 reaches the ground level so that the output of an operational amplifier OA2 inverts to "High" to stop the counting of the A/D conversion counter. Thus, the A/D conversion utilizes the method of the dual slope integration type A/D conversion. The circuit construction of such an A/D converter is shown in detail, for example, in a Japanese laid-open application No. Tokkai-Sho 56-18732 and European patent publication No. 22524.

When the A/D conversion has been completed, the potentials at terminals j6 and j7 are made "Low" and "High" respectively so that the circuits, other than the microcomputer 33, are reset to their initial conditions and the operation jumps to step #44 wherein it is judged whether or not the content of the register BFJ is "000". When the content is "000", the operation jumps to step #45, while it jumps to step #48, when the content is not "000".

In step #45, the data FB1 of the emitted light amount that was calculated in step #11, is calculated again based on the monitored data MB1. The calculation is made in the following manner:
If $$EBt \geq 32 \cdot MB1 \tag{10}$$

the amount of light to be emitted is reduced by one step. The example, if FB1=128 at the first light emission, 64 is set for FB1.
If $$32 \cdot MB1 > EBT \geq 16 \cdot MB1 \tag{11}$$

The data for FB1 is unchanged.
If $$16 \cdot MB1 > EBt \tag{12}$$

the data of the emitted light amount will be increased by one step.

Then, when the one light emission has been completed at step #46, "001" is set in register BFJ and a calculation of $$EBr = EBt - MB1$$

is made, and the operation proceeds to step 190 20.

When the content of register BFJ is not "000" in #44, it is discriminated in step #48 whether the content is "001" or not. If the content is "001", this means that the light emission was made by FB1 and the process proceeds to step #49, wherein the calculation $$EBr - MB1$$

is made and it is discriminated whether or not $$EBr - MB1 \geq 16 \cdot MB1$$

If $$EBr - MB1 \geq 16 \cdot MB1$$

the operation returns to step #20 to continue the light emission by the amount of FB1. If $$EBr - MB1 < 16 \cdot MB1$$

The data of light to be emitted is changed to FB2, which is one step smaller than FB1, and "010" is set in the register BFJ and then the operation is returned to step #20. The data FB2 may be calculated from FB1 by shifting the data of FB1 by one bit to the right.

If the content of the register BFJ is not "001" in step 190 48, it is discriminated in step #52 whether the content of the register BFJ is 010 or not. When it is discriminated that the content is "010", this means that the light was emitted by FB2 and the operation jumps to step #53 wherein the calculation of $$EBr - MB2$$

is made, and it is discriminated whether or not $$EBr - MB2 \geq 2 \cdot MB2$$

If $$EBr - MB2 \geq 2 \cdot MB2$$

the operation jumps to step #20 to continue the light emission by FB2. On the other hand, if $$EBr - MB2 < 2MB2$$

FB3 is calculated by shifting the data FB2 of the emitted light amount by one bit to the right with "011" being set in the register BFJ. After that the operation returns to step #20.

If the content of the register BFJ is not "010" at step #52, it means that the light emission is equal to the amount FB3 and the operation jumps to step #56 wherein a calculation of $$EBr - MB3$$

is made, and it is discriminated whether $$EBr - MB3 > 0$$

If $$EBr - MB3 > 0$$

the operation jumps to step #20 to continue the light emission by FB3, while if $$EBr - MB3 \leq 0$$

this means that the exposure has been completed. Then the data "100", representative that flash firing is not necessary, is set in the register BFJ and the process is transferred to step #20.

Returning back to FIG. 5, the data in the tube selection register FSR is shifted by one bit to the right. Accordingly, step #20 is executed after the light emission of the blue light Xenon tube XB, then the data in the register FSR will become "010" for firing the green light Xenon tube XG. If it is after the light emission of the green Xenon tube XG, the data will become "001" for actuating the red light Xenon tube XR. After the light emission of the red light Xenon tube XR, data will be changed to "000". In step #21, it is discriminated whether the content of the register FSR is "000" or not. If the content is not "000", the operation jumps to step #13, wherein the content of the register FSR is discriminated again to execute the light emisson control of the green light Xenon tube XG for the data "010" and of the red light Xenon tube XR for the data "001". The processes in steps #16 and #17, and #18 and #19 are the same as in the step #14 and #15, and the detailed flowchart of the process in the steps #17 and #19 is the same as that shown in FIGS. 6(A) and 6(B). Accordingly, detailed explanation is neglected here as to steps 16 through 19. It should be understood that in the case of the operation in steps #16 and #17, and #18 and #19, the above description of the flowchart of FIGS. 6(A) and 6(B) should be read by changing j2 to j3 or j4; BFJ to GFJ or RFJ; FB1 to FG1 and FR1; FB2 to FG2 or FR2; FB3 to FG3 or FR3; FBt to FGt or FRt; EBr to EGr or ERr; MB1 to MG1 or MR1; MB2 to MG2 or MR2; and MB3 to MG3 and MR3.

When the content of the register SFR is "000" in step #21, it is discriminated in steps #23, #24 and #25 whether or not the contents in the registers BFJ, GFJ and RFJ are "100", which means that further light emission is not necessary. If the discrimination indicates the necessity of light emission, "100" is set in the tube selection register FSR and the operation returns to step #13 from which the light emission control operation described above will be repeated. On the other hand, if any Xenon tube need not be actuated, the operation returns to the start and the operations of steps #4 to #12 are repeated after the operations of steps #1 to #3.

Figure 7:
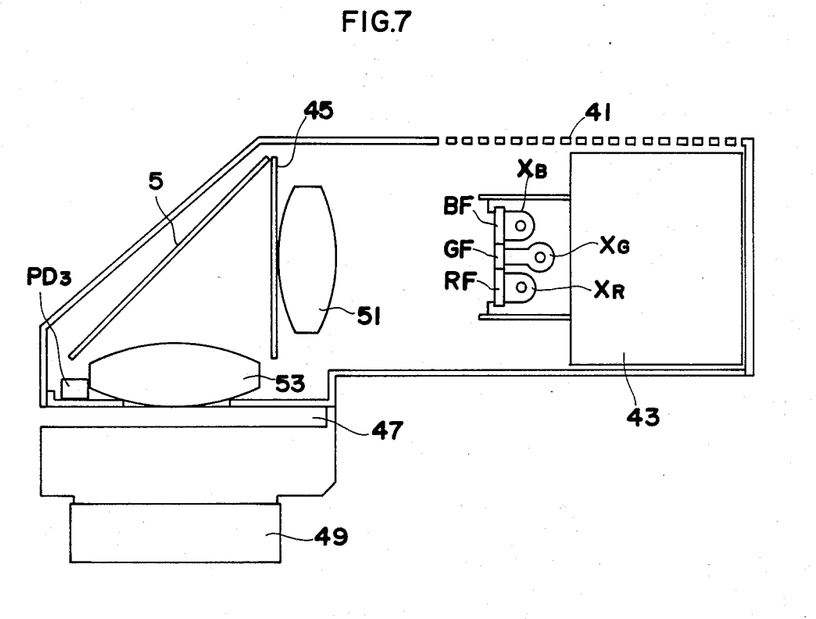
FIG. 7 is a schematic cross sectional view of the light-source-including the head portion of the color enlarger shown in FIG. 4.

FIG. 7 is a cross-sectional view of the head of the color enlarger shown in FIG. 4. The portion 41 is louvered for dispersing heat. Block 43 includes a driving circuit for the Xenon tubes XB, XG and XR. Blue, green and red filters BF, GF and RF are disposed respectively at the light emanating openings for the blue, green and red light Xenon tubes XB, XG and XR. The reference numerals 51 and 53 denote condenser lenses. A light diffuser plate 45 serves such that the light emittted from the Xenon tube XB, XG and XR emanates uniformly from the condenser lens 53. The reference numeral 5 denotes a reflex mirror, while 47 represents the mount for receiving a negative film carrier and 45 denotes a projection lens mount.

Table 4 showed the amounts of emitted light corresponding to the duration of the light emission on the assumption that the capacitance and charged voltage of the main capacitor is constant. However, the above embodiment possibly has a problem in that accurate control of the emitted light can be made only in the range of 0 to −5 Ev owing to the speed of the processing of the microcomputer 33, the light emission with the reverse charging of the commutation capacitor C1, and other conditions. To solve such a problem, two main capacitors with different capacitances may be provided for controlling the duration of the light emission in a wide range in the manner that a main capacitor of a large capacitance is used for the control of the light amount of the data from 1024 to 32 in the table 4, while a main capacitor of a smaller capacitance is used for the control of the light amount of the data from 16 to 2. A definite example of such controls is omitted here because it will be easily put into practice by those skilled in the art.

In the embodiment shown in FIG. 4 wherein the present invention was applied to a color enlarger, the Xenon tubes are selectively fired one after another in the order of blue, green and red. Accordingly, when the exposure is suspended, the Xenon tubes can be controlled such that the ratios of the exposures made until the suspension to the total exposures are substantially equal among the blue, green and red lights. Hence, the embodiment is advantageous in facilitating shading and burning during the printing.

The present invention has been described in connection with embodiments wherein the present invention was applied to a color additive type color enlarger. However, the invention is not limited to such an application but may be applied to various light source devices such as of a monochromatic photographic enlarger, photo-graving camera, a light source for photocopying and the like.

We claim:

1. An improved flash illumination system having a microprocessor-based control circuit for controlling the amount of exposure light, comprising:
   means for emitting a plurality of pulses of light;
   means for providing an exposure signal representative of the value of the total amount of desired light exposure;
   calculating means for dividing a light exposure value into a plurality of identical light pulses of a fixed duration and quantity of light;
   a detector unit for monitoring the emitted pulses of light and producing a representative signal of the total value of light measured;
   means for activating the calculating means to calculate from the exposure signal a first set of identical light pulses of a fixed duration and quantity of light, and causing the means for emitting pulses of light to produce the first set of pulses; and
   means for comparing the exposure signal with a measured representative signal of the first set of pulses and producing a difference signal, the calculating means then providing a second set of identical light pulses of a lesser quantity of light based on the difference signal whereby the second set of pulses are emitted by the means for emitting pulses of light.

2. The invention of claim 1 further including means for storing data representative of the minimum amount of exposure for use by the calculating means in calculating the duration and quantity of light for each set of pulses.

3. The invention of claim 2 wherein the means for emitting a plurality of pulses of light includes means for emitting blue, green and red light.

4. An improved color print enlarger having a microprocessor-based control circuit for controlling the amount of exposure light of different colors, comprising:
   means for emitting a plurality of pulses of light of different colors;
   means for providing an exposure signal representative of the value of the total amount of desired light exposure for each color;
   means for storing data representative of the amount of pulses for different light exposures;
   calculating means responsive to the stored data for dividing a light exposure value into a plurality of identical light pulses of a fixed duration and quantity of light;
   a detector unit for monitoring the emitted pulses of light and producing a representative signal of the total value of light measured;
   means for activating the calculating means to calculate from the exposure signal a first set of identical light pulses of a fixed duration and quantity of light, and causing the means for emitting pulses of light to produce the first set of pulses; and
   means for comparing the exposure signal with a measured representative signal of the first set of pulses and producing a difference signal, the calculating means then providing a second set of identical light pulses of a lesser quantity of light based on the difference signal whereby the second set of pulses are emitted by the means for emitting pulses of light.

5. A light source device for exposure, comprising:
means for emitting a plurality of pulses of light;
means for outputting an exposure signal which represents a desired amount of light exposure;
means for monitoring the amount of pulse light emitted from said emitting means to produce a monitored signal which represents the monitored amount of each pulse light emission;
means for calculating, in accordance with said exposure signal, the number of pulse light emissions and the amount of pulse light to be emitted during each pulse output to produce a data signal which represents said number and said light emission amount calculated for each pulse; and
means for controlling the number of said emissions and the amount of pulse light of each emission in accordance with said data signal including means for controlling the duration of each pulse light emission in accordance with said monitored signal to control the amount of each pulse light emission.

6. A light source device for exposure as claimed in claim 5, wherein said emitting means includes a plurality of flash tubes and filters, respectively disposed in front of each flash tube, having different spectral characteristics from each other, said calculating means calculates the number of pulse light emissions and the amount of each pulse light emission for each flash tube and said controlling means sequentially fires said flash tubes one after another.

7. A light source device for exposure as claimed in claim 5, wherein said controlling means includes means for comparing said monitored amount with said calculated amount of each pulse light emission in accordance with said monitored signal and said data signal, and means for interrupting a pulse light emission of said emitting means when said monitored amount and said calculated amount when compared with each other attains a predetermined relationship.

8. A light source device for exposure, comprising:
means for emitting a plurality of pulses of light;
means for outputting an exposure signal which represents a desired amount of light exposure; means for calculating, in accordance with said exposure signal, the number of pulse light emissions and the amount of pulse light to be emitted during each pulse output to produce a data signal which represents said number and said light emission amount calculated for each pulse, including means for determining a first amount of pulse light for emission in accordance with said exposure signal, means for calculating a value by subtracting the total amount of pulse light which has been emitted from said emitting means from the first amount of exposure, means for determining a second amount of pulse light emission which is less than said first amount when said first amount and said subtracted value attain a predetermined relationship between each other, and means for determining a third amount of pulse light emission which is less than said second amount when said second amount and said subtracted value attain a predetermined relationship between each other, whereby the amount of each pulse light emission is decreased until the subtracted value becomes negligible for the purposes of the exposure, and
means for controlling the number of said emissions and the amount of pulse light of each emission in accordance with said data signal.

9. A light source device for exposure as claimed in claim 8, wherein said emitting means includes a plurality of flash tubes and filters, respectively disposed in front of each flash tube, having different spectral characteristics from each other, said calculating means calculates the number of pulse light emissions and the amount of each pulse light emission for each flash tube and said controlling means sequentially fires said flash tubes one after another.

10. A light source device for exposure as claimed in claim 8, wherein said controlling means includes means for comparing said monitored amount with said calculated amount of each pulse light emission in accordance with said monitored signal and said data signal, and means for interrupting a pulse light emission of said emitting means when said monitored amount and said calculated amount when compared with each other attains a predetermined relationship.

* * * * *